United States Patent
Waite et al.

(10) Patent No.: US 10,326,858 B2
(45) Date of Patent: Jun. 18, 2019

(54) SYSTEM AND METHOD FOR DYNAMICALLY GENERATING PERSONALIZED WEBSITES

(71) Applicant: CDK Global, LLC, Hoffman Estates, IL (US)

(72) Inventors: Benjamin Waite, Snohomish, WA (US); Deepak Goindwani, Sammamish, WA (US); Loren West, Mukilteo, WA (US); Jason Taylor, Seattle, WA (US); John Cokos, Lynnwood, WA (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 0 days.

(21) Appl. No.: 15/602,999

(22) Filed: May 23, 2017

(65) Prior Publication Data
US 2018/0341628 A1    Nov. 29, 2018

(51) Int. Cl.
| | |
|---|---|
| G06F 17/20 | (2006.01) |
| H04L 29/08 | (2006.01) |
| G06Q 10/00 | (2012.01) |
| G06F 16/958 | (2019.01) |

(52) U.S. Cl.
CPC .......... *H04L 67/306* (2013.01); *G06F 16/958* (2019.01); *G06Q 10/00* (2013.01); *H04L 67/02* (2013.01); *H04L 67/303* (2013.01)

(58) Field of Classification Search
None
See application file for complete search history.

(56) References Cited

U.S. PATENT DOCUMENTS

| | | |
|---|---|---|
| 4,992,940 A | 2/1991 | Dworkin |
| 5,421,015 A | 5/1995 | Khoyi et al. |
| 5,521,815 A | 5/1996 | Rose, Jr. |
| 5,649,186 A | 7/1997 | Ferguson |
| 5,694,595 A | 12/1997 | Jacobs et al. |
| 5,787,177 A | 7/1998 | Leppek |
| 5,790,785 A | 8/1998 | Klug et al. |
| 5,835,712 A | 11/1998 | DuFresne |
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |

(Continued)

OTHER PUBLICATIONS

Non-Final Office Action dated Oct. 6, 2017 in U.S. Appl. No. 13/025,019.

(Continued)

*Primary Examiner* — Keith D Bloomquist
(74) *Attorney, Agent, or Firm* — Stoel Rives LLP

(57) ABSTRACT

The present disclosure provides for personalizing content, an outline, and a theme for a web page. Personalizing content can include associating a profile with a web page request; generating a graph including nodes and links based on the profile; generating a plurality of cards from the nodes and the links of the graph; selecting the outline and the theme based on the profile; generating a page code from the plurality of cards, the outline, and the theme; and providing the page code to the web server.

19 Claims, 9 Drawing Sheets

(56) References Cited

U.S. PATENT DOCUMENTS

| | | |
|---|---|---|
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | LeMole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,185,614 B1 | 2/2001 | Cuomo et al. |
| 6,189,104 B1 | 2/2001 | Leppek |
| 6,219,667 B1 | 4/2001 | Lu et al. |
| 6,236,994 B1 | 5/2001 | Swartz et al. |
| 6,289,382 B1 | 9/2001 | Bowman-Amuah |
| 6,295,061 B1 | 9/2001 | Park et al. |
| 6,343,302 B1 | 1/2002 | Graham |
| 6,353,824 B1 | 3/2002 | Boguraev et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,205 B1 | 1/2003 | Kothuri et al. |
| 6,519,617 B1 | 2/2003 | Wanderski et al. |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,643,663 B1 | 11/2003 | Dabney et al. |
| 6,654,726 B1 | 11/2003 | Hanzek |
| 6,678,706 B1 | 1/2004 | Fishel |
| 6,697,825 B1 | 2/2004 | Underwood et al. |
| 6,721,747 B2 | 4/2004 | Lipkin |
| 6,728,685 B1 | 4/2004 | Ahluwalia |
| 6,738,750 B2 | 5/2004 | Stone et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,871,216 B2 | 3/2005 | Miller et al. |
| 6,901,430 B1 | 3/2005 | Smith |
| 6,917,941 B2 | 7/2005 | Wight et al. |
| 6,922,674 B1 | 7/2005 | Nelson |
| 6,944,677 B1 | 9/2005 | Zhao |
| 6,963,854 B1 | 11/2005 | Boyd et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 7,000,184 B2 | 2/2006 | Matveyenko et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 | 5/2006 | Svedloff |
| 7,062,506 B2 | 6/2006 | Taylor et al. |
| 7,072,943 B2 | 7/2006 | Landesmann |
| 7,107,268 B1 | 9/2006 | Zawadzki et al. |
| 7,124,116 B2 | 10/2006 | Huyler |
| 7,152,207 B1 | 12/2006 | Underwood et al. |
| 7,155,491 B1 | 12/2006 | Schultz et al. |
| 7,171,418 B2 | 1/2007 | Blessin |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,433,891 B2 | 10/2008 | Haber et al. |
| 7,496,543 B1 | 2/2009 | Bamford et al. |
| 7,536,641 B2 | 5/2009 | Rosenstein et al. |
| 7,548,985 B2 | 6/2009 | Guigui |
| 7,587,504 B2 | 9/2009 | Adams et al. |
| 7,593,925 B2 | 9/2009 | Cadiz et al. |
| 7,624,342 B2 | 11/2009 | Matveyenko et al. |
| 7,657,594 B2 | 2/2010 | Banga et al. |
| 7,747,680 B2 | 6/2010 | Ravikumar et al. |
| 7,778,841 B1 | 8/2010 | Bayer et al. |
| 7,801,945 B1 | 9/2010 | Geddes et al. |
| 7,861,309 B2 | 12/2010 | Spearman et al. |
| 7,865,409 B1 | 1/2011 | Monaghan |
| 7,870,253 B2 | 1/2011 | Muilenburg et al. |
| 7,979,506 B2 | 7/2011 | Cole |
| 8,051,159 B2 | 11/2011 | Muilenburg et al. |
| 8,055,544 B2 | 11/2011 | Ullman et al. |
| 8,209,259 B2 | 6/2012 | Graham, Jr. et al. |
| 8,271,473 B2 | 9/2012 | Berg |
| 8,271,547 B2 | 9/2012 | Taylor et al. |
| 8,275,717 B2 | 9/2012 | Ullman et al. |
| 8,355,950 B2 | 1/2013 | Colson et al. |
| 8,438,310 B2 | 5/2013 | Muilenburg et al. |
| 8,521,654 B2 | 8/2013 | Ford et al. |
| 8,538,894 B2 | 9/2013 | Ullman et al. |
| 8,645,193 B2 | 2/2014 | Swinson et al. |
| 8,725,341 B2 | 5/2014 | Ogasawara |
| 8,849,689 B1 | 9/2014 | Jagannathan et al. |
| 8,886,389 B2 | 11/2014 | Edwards et al. |
| 9,754,304 B2 | 9/2017 | Taira et al. |
| 9,836,714 B2 | 12/2017 | Lander et al. |
| 10,032,139 B2 | 7/2018 | Adderly et al. |
| 10,083,411 B2 | 9/2018 | Kinsey et al. |
| 2001/0005831 A1 | 6/2001 | Lewin et al. |
| 2001/0037332 A1* | 11/2001 | Miller ............... G06F 17/30545 |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones |
| 2002/0026359 A1 | 2/2002 | Long et al. |
| 2002/0032626 A1 | 3/2002 | DeWolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0059260 A1 | 5/2002 | Jas |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116418 A1 | 8/2002 | Lachhwani et al. |
| 2002/0123359 A1 | 9/2002 | Wei et al. |
| 2002/0124053 A1 | 9/2002 | Adams et al. |
| 2002/0129054 A1 | 9/2002 | Ferguson et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0196273 A1 | 12/2002 | Krause |
| 2002/0198761 A1 | 12/2002 | Ryan et al. |
| 2002/0198878 A1 | 12/2002 | Baxter et al. |

(56) References Cited

U.S. PATENT DOCUMENTS

| | | |
|---|---|---|
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0061263 A1 | 3/2003 | Riddle |
| 2003/0065532 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0117046 A1 | 6/2004 | Colle et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0199413 A1 | 10/2004 | Hauser et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0171836 A1 | 8/2005 | Leacy |
| 2005/0187834 A1 | 8/2005 | Painter et al. |
| 2005/0228736 A1 | 10/2005 | Norman et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2007/0005446 A1 | 1/2007 | Fusz et al. |
| 2007/0016486 A1 | 1/2007 | Stone et al. |
| 2007/0033520 A1 | 2/2007 | Kimzey et al. |
| 2007/0053513 A1 | 3/2007 | Hoffberg |
| 2007/0150368 A1 | 6/2007 | Arora et al. |
| 2007/0209011 A1 | 9/2007 | Padmanabhuni et al. |
| 2007/0250327 A1 | 10/2007 | Hedy |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2008/0015929 A1 | 1/2008 | Koeppel et al. |
| 2008/0027827 A1 | 1/2008 | Eglen et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1 | 4/2009 | Blair et al. |
| 2009/0182232 A1 | 7/2009 | Zhang et al. |
| 2009/0204454 A1 | 8/2009 | Lagudi |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100506 A1 | 4/2010 | Marot |
| 2010/0293030 A1 | 11/2010 | Wu |
| 2010/0312608 A1 | 12/2010 | Shan et al. |
| 2010/0318408 A1 | 12/2010 | Sankaran et al. |
| 2010/0324777 A1 | 12/2010 | Tominaga et al. |
| 2011/0010432 A1 | 1/2011 | Uyeki |
| 2011/0022525 A1 | 1/2011 | Swinson et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | DuPont |
| 2011/0224864 A1 | 9/2011 | Gellatly et al. |
| 2011/0307411 A1 | 12/2011 | Bolivar et al. |
| 2012/0089474 A1 | 4/2012 | Xiao et al. |
| 2012/0209714 A1 | 8/2012 | Douglas et al. |
| 2012/0221125 A1 | 8/2012 | Bell |
| 2012/0278886 A1 | 11/2012 | Q |
| 2013/0046432 A1 | 2/2013 | Edwards et al. |
| 2013/0080196 A1 | 3/2013 | Schroeder et al. |
| 2013/0332023 A1 | 12/2013 | Bertosa et al. |
| 2014/0026037 A1* | 1/2014 | Garb ................ G06F 17/30893 715/235 |
| 2014/0088866 A1 | 3/2014 | Knapp et al. |
| 2014/0094992 A1 | 4/2014 | Lambert et al. |
| 2014/0229391 A1 | 8/2014 | East et al. |
| 2014/0278805 A1 | 9/2014 | Thompson |
| 2014/0324275 A1 | 10/2014 | Stanek et al. |
| 2014/0337163 A1* | 11/2014 | Whisnant .......... G06Q 30/0631 705/26.7 |
| 2014/0379530 A1 | 12/2014 | Kim et al. |
| 2015/0057875 A1 | 2/2015 | McGinnis et al. |
| 2015/0066781 A1 | 3/2015 | Johnson et al. |
| 2015/0100199 A1 | 4/2015 | Kurnik et al. |
| 2015/0278886 A1 | 10/2015 | Fusz |
| 2015/0286979 A1 | 10/2015 | Ming et al. |
| 2016/0071054 A1 | 3/2016 | Kakarala et al. |
| 2016/0140622 A1* | 5/2016 | Wang ................ G06Q 30/0269 705/14.66 |
| 2016/0148439 A1 | 5/2016 | Akselrod et al. |
| 2017/0124525 A1 | 5/2017 | Johnson et al. |
| 2017/0308844 A1 | 10/2017 | Kelley |
| 2017/0308864 A1 | 10/2017 | Kelley |
| 2017/0308865 A1 | 10/2017 | Kelley |

(56) References Cited

U.S. PATENT DOCUMENTS

2018/0285901 A1 10/2018 Zackrone
2018/0285925 A1 10/2018 Zackrone

OTHER PUBLICATIONS

Final Office Action for U.S. Appl. No. 14/208,042, filed Mar. 13, 2014, and dated from the USPTO dated Jan. 11, 2019 , 16 pgs.
"NetFormx Offers Advanced Network Discovery Software". PR Newswire. Mar. 15, 1999. Retrieved from http://www.highbeam.com/doc/1G1-54102907.html>.
Advisory Action for U.S. Appl. No. 14/208,042, filed Mar. 13, 2014, and dated from the USPTO dated Jul. 12, 2018.
Anonymous, "Software ready for prime time." Automotive News. Detroit, Nov. 5, 2001. vol. 76, Issue 5996, p. 28.
Chen, Deren, "Business to Business Standard and Supply Chain System Framework in Virtual Enterprises," Computer Supported Cooperative Work in Design, The Sixth International Conference on, 2001; Publication Year: 2001, pgs. 472-476.
CNY Business Journal, "Frank La Voila named Southern Tier Small-Business Person of 1999". Jun. 11, 1999. 2 pgs.
Dallas Morning News, "I know someone who knows Kevin Bacon". Oct. 27, 1998. 4 pgs.
Davis, Peter T. et al., "Sams Teach Yourself Microsoft Windows NT Server 4 in 21 Days," Sams® Publishing, © 1999. ISBN: 0-672-31555-6, 15 pgs., printed Dec. 21, 2008.
Derfler, Frank J. et al., "How Networks Work: Millennium Edition," Que, A Division of Macmillan Computer Publishing, © 2000. ISBN: 0-7897-2445-6, 9 pgs.
Final Office Action for U.S. Appl. No. 10/350,795, filed Jan. 24, 2003, and dated from the USPTO dated Mar. 3, 2010, 24 pgs.
Final Office Action for U.S. Appl. No. 10/351,465, filed Jan. 24, 2003, and dated from the USPTO dated May 5, 2005, 8 pgs.
Final Office Action for U.S. Appl. No. 11/524,602, filed Sep. 21, 2006, and dated from the USPTO dated Jun. 26, 2012, 11 pgs.
Final Office Action for U.S. Appl. No. 13/025,019, filed Feb. 10, 2011, and dated from the USPTO dated Jul. 13, 2018, 11 pgs.
Final Office Action for U.S. Appl. No. 13/025,019, filed Feb. 20, 2011, and dated from the USPTO dated Dec. 20, 2016, 16 pgs.
Final Office Action for U.S. Appl. No. 14/208,042, filed Mar. 13, 2014, and dated from the USPTO dated Apr. 16, 2018.
Final Office Action for U.S. Appl. No. 14/208,042, filed Mar. 13, 2014, and dated from the USPTO dated Dec. 6, 2016, 26 pgs.
Final Office Action dated Sep. 21, 2018 in U.S. Appl. No. 15/134,820.
http://web.archive.org/web/20010718130244/http://chromedata.com/maing2/about/index.asp, 1 pg.
http://web.archive.org/web/20050305055408/http://www.dealerclick.com/, 1 pg.
http://web.archive.org/web/20050528073821/http://www.kbb.com/, 1 pg.
http://web.archive.org/web/20050531000823/http://www.carfax.com/, 1 pg.
IBM Tivoli Access Manager Base Administration Guide, Version 5.1.2003, International Business Machines Corporation. Entire book enclosed and cited. 402 pgs.
Interconnection. (2003). In Roget's II The New Thesaurus. Boston, MA: Houghton Mifflin. Retrieved Jul. 16, 2009, from http://www.credoreference.com/entry/hmrogets/interconnection, 1 pg.
Java 2 Platform, Enterprise Edition (J2EE) Overview, printed Mar. 6, 2010, 3 pgs.
Java version history—Wkipedia, the free encyclopedia, printed Mar. 6, 2010, 9 pgs.
Michener, J.R., et al., "Managing System and Active-Content Integrity," Computer; vol. 33, Issue: 7; Publication Year: 2000, pp. 108-110.
Non-Final Office Action for U.S. Appl. No. 10/350,795, filed Jan. 24, 2003, and dated from the USPTO dated Dec. 26, 2008, 13 pgs.
Non-Final Office Action for U.S. Appl. No. 10/350,795, filed Jan. 24, 2003, and dated from the USPTO dated Feb. 6, 2006, 11 pgs.
Non-Final Office Action for U.S. Appl. No. 10/350,795, filed Jan. 24, 2003, and dated from the USPTO dated Jul. 22, 2009, 22 pgs.
Non-Final Office Action for U.S. Appl. No. 10/350,795, filed Jan. 24, 2003, and dated from the USPTO dated Jun. 29, 2006, 11 pgs.
Non-Final Office Action for U.S. Appl. No. 10/350,795, filed Jan. 24, 2003, and dated from the USPTO dated Mar. 12, 2007, 10 pgs.
Non-Final Office Action for U.S. Appl. No. 10/350,795, filed Jan. 24, 2003, and dated from the USPTO dated May 29, 2008, 10 pgs.
Non-Final Office Action for U.S. Appl. No. 10/350,795, filed Jan. 24, 2003, and dated from the USPTO dated Nov. 1, 2010, 19 pgs.
Non-Final Office Action for U.S. Appl. No. 10/350,796, filed Jan. 24, 2003 and dated from the USPTO dated May 19, 2005, 7 pgs.
Non-Final Office Action for U.S. Appl. No. 10/351,465, filed Jan. 24, 2003, and dated from the USPTO dated Jul. 27, 2004, 9 pgs.
Non-Final Office Action for U.S. Appl. No. 10/351,606, filed Jan. 24, 2003, and dated from the USPTO dated Dec. 19, 2005, 8 pgs.
Non-Final Office Action for U.S. Appl. No. 10/351,606, filed Jan. 24, 2003, and dated from the USPTO dated May 17, 2004, 6 pgs.
Non-Final Office Action for U.S. Appl. No. 10/665,899, filed Sep. 18, 2003, and dated from the USPTO dated Sep. 17, 2007, 11 pgs.
Non-Final Office Action for U.S. Appl. No. 11/414,939, filed May 1, 2006, and dated from the USPTO dated Jul. 19, 2010, 7 pgs.
Non-Final Office Action for U.S. Appl. No. 11/414,939, filed May 1, 2006, and dated from the USPTO dated Mar. 9, 2010, 11 pgs.
Non-Final Office Action for U.S. Appl. No. 11/446,011, filed Jun. 2, 2006, and dated from the USPTO dated Nov. 27, 2009, 24 pgs.
Non-Final Office Action for U.S. Appl. No. 11/524,602, filed Sep. 21, 2006, and dated from the USPTO dated Nov. 14, 2011, 19 pgs.
Non-Final Office Action for U.S. Appl. No. 11/525,009, filed Sep. 21, 2006, and dated from the USPTO dated Aug. 10, 2011, 18 pgs.
Non-Final Office Action for U.S. Appl. No. 14/208,042, filed Mar. 13, 2014, and dated from the USPTO dated Jun. 30, 2016, 23 pgs.
Non-Final Office Action for U.S. Appl. No. 14/208,042, filed Mar. 13, 2014, and dated from the USPTO dated Sep. 20, 2017.
Non-Final Office Action for U.S. Appl. No. 14/208,042, filed Mar. 13, 2014, and dated from the USPTO dated Sep. 21, 2018.
Non-Final Office Action for U.S. Appl. No. 15/134,820, filed Apr. 21, 2016, and dated from the USPTO dated Feb. 23, 2018.
Notice of Allowance and Fee(s) Due for U.S. Appl. No. 10/350,795, filed Jan. 24, 2003, and dated from the USPTO dated May 7, 2012, 15 pgs.
Notice of Allowance and Fee(s) Due for U.S. Appl. No. 10/350,796, filed Jan. 24, 2003 and dated from the USPTO dated Feb. 1, 2006, 5 pgs.
Notice of Allowance and Fee(s) Due for U.S. Appl. No. 10/351,465, filed Jan. 24, 2003, and dated from the USPTO dated Sep. 21, 2005, 4 pgs.
Notice of Allowance and Fee(s) Due for U.S. Appl. No. 10/351,606, filed Jan. 24, 2003, and dated from the USPTO dated Apr. 4, 2006, 12 pgs.
Notice of Allowance and Fee(s) Due for U.S. Appl. No. 11/414,939, filed May 1, 2006, and dated from the USPTO dated Nov. 2, 2010, pgs.
Notice of Allowance and Fee(s) Due for U.S. Appl. No. 11/446,011, filed Jun. 2, 2006, and dated from the USPTO dated Aug. 9, 2011, 10 pgs.
Notice of Allowance and Fee(s) Due for U.S. Appl. No. 11/524,602, filed Sep. 21, 2006, and dated from the USPTO dated Aug. 6, 2013, 22 pgs.
Notice of Allowance and Fee(s) Due for U.S. Appl. No. 11/525,009, filed Sep. 21, 2006, and dated from the USPTO dated Jul. 23, 2012, 19 pgs.
Notice of Allowance and Fee(s) Due for U.S. Appl. No. 12/243,855, filed Oct. 1, 2008, and dated from the USPTO dated Oct. 28, 2010, 5 pgs.
Notice of Non-compliant Amendment dated Dec. 12, 2006 in U.S. Appl. No. 10/350,810.
Permissions in the Java™ 2 SDK, printed Mar. 6, 2010, 45 pgs.
Strebe, Matthew et al. MCSE: NT Server 4 Study Guide, Third Edition. 2000, SYBEX Inc. Front mater, pp. 284-293, and 308-347 are included. Entire book cited, 36 pgs.
Trademark Electronic Search System record for Serial No. 76375405, Word Mark "NITRA".

(56) References Cited

OTHER PUBLICATIONS

Lee, Adam J. et al., "Searching for Open Windows and Unlocked Doors: Port Scanning in Large-Scale Commodity Clusters," Cluster Computing and the Grid, 2005. CCGrid 2005. IEEE International Symposium on vol. 1; Publication Year: 2005,, pp. 146-151 vol. 1.
Non-Final Office Action for U.S. Appl. No. 15/134,779, filed Apr. 21, 2016, and dated from the USPTO dated Jan. 30, 2019, 26 pgs.
Non-Final Office Action received in U.S. Appl. No. 15/134,793, filed Apr. 21, 2016, dated by United States Patent and Trademark Office dated Jan. 30, 2019, 26 pgs.
"An Appointment with Destiny—The Time for Web-Enabled Scheduling has Arrived", Link Fall, 2007, 2 pages.
"How a Solution found a Problem of Scheduling Service Appointments", Automotive News, 2016, 4 pages.
"Service Advisor", Automotive Dealership Institute, 2007, 26 pages.
"xTime.com Web Pages", Jan. 8, 2015, 1 page.
"xTimes Newsletter", vol. 7, 2013, 4 pages.
U.S. Appl. No. 15/134,820, Notice of Allowance, dated Jan. 28, 2019, 7 pages.
Croswell, "Service Shop Optimiztion", Modern Tire Retailer, May 21, 2013, 7 pages.
Emmanuel, "Basics to Creating an Appointment System for Automotive Service Customers", Automotiveservicemanagement.com, 2006, 9 pages.
Aloisio, Giovanni et al., "Web-based access to the Grid using the Grid Resource Broker portal," Google 2002, pp. 1145-1160.
Chadwick, D. W., "Understanding X.500—The Directory." Available at <http://sec.cs.kent.ac.uk/x500book/>. 1996. Entire work cited.
Final Office Action for U.S. Appl. No. 10/350,795, filed Jan. 24, 2003, and dated from the USPTO dated Jul. 6, 2011, 26 pgs.
Final Office Action for U.S. Appl. No. 10/350,810, filed Jan. 24, 2003, and dated from the USPTO dated Apr. 5, 2005, 12 pgs.
Final Office Action for U.S. Appl. No. 10/350,810, filed Jan. 24, 2003, and dated from the USPTO dated May 18, 2006, 15 pgs.
Final Office Action for U.S. Appl. No. 10/350,810, filed Jan. 24, 2003, and dated from the USPTO dated Nov. 14, 2007, 13 pgs.
Final Office Action for U.S. Appl. No. 10/665,899, filed Sep. 18, 2003, and dated from the USPTO dated Feb. 24, 2010, 22 pgs.
Final Office Action for U.S. Appl. No. 10/665,899, filed Sep. 18, 2003, and dated from the USPTO dated Jul. 7, 2008, 11 pgs.
Final Office Action for U.S. Appl. No. 10/665,899, filed Sep. 18, 2003, and dated from the USPTO dated Mar. 8, 2011, 21 pgs.
Final Office Action for U.S. Appl. No. 10/665,899, filed Sep. 18, 2003, and dated from the USPTO dated May 11, 2009, 14 pgs.
Final Office Action for U.S. Appl. No. 11/149,909, filed Jun. 10, 2005, and dated from the USPTO dated Feb. 4, 2009, 14 pgs.
Final Office Action for U.S. Appl. No. 11/442,821, filed May 30, 2006, and dated from the USPTO dated Apr. 7, 2009, 19 pgs.
Final Office Action for U.S. Appl. No. 11/442,821, filed May 30, 2006, and dated from the USPTO dated May 21, 2010, 28 pgs.
Final Office Action for U.S. Appl. No. 11/442,821, filed May 30, 2006, and dated from the USPTO dated Nov. 29, 2011, 26 pgs.
Final Office Action for U.S. Appl. No. 11/446,011, filed Jun. 2, 2006, and dated from the USPTO dated Jun. 8, 2010, 12 pgs.
Final Office Action for U.S. Appl. No. 11/524,602, filed Sep. 21, 2006, and dated from the USPTO dated Jul. 27, 2010, 13 pgs.
Final Office Action for U.S. Appl. No. 11/525,009, filed Sep. 21, 2006, and dated from the USPTO dated Aug. 3, 2010, 16 pgs.
Final Office Action for U.S. Appl. No. 12/243,852, filed Oct. 1, 2008, and dated from the USPTO dated Oct. 24, 2011, 13 pgs.
Final Office Action for U.S. Appl. No. 12/243,861, filed Oct. 1, 2008, and dated from the USPTO dated Jun. 22, 2011, 5 pgs.
Final Office Action for U.S. Appl. No. 13/025,019, filed Feb. 10, 2011, and dated from the USPTO dated Aug. 28, 2015, 25 pgs.
Final Office Action for U.S. Appl. No. 13/025,019, filed Feb. 10, 2011, and dated from the USPTO dated Dec. 20, 2016, 16 pgs.
Final Office Action for U.S. Appl. No. 13/025,019, filed Feb. 10, 2011, and dated from the USPTO dated Sep. 12, 2013, 13 pgs.
Hogue et al., "Thresher: Automating the Unwrapping of Semantic Content from the World Wide Web," ACM 2005, pp. 86-95.
Housel, Barron C. et al., "WebExpress: A client/intercept based system for optimizing Web browsing in a wireless environment," Google 1998, pp. 419-431.
Internet Archive Wayback Machine, archive of LDAP Browser.com—FAQ. Archived Dec. 11, 2000. Available at <http://web.archive.org/web/20001210152/http://www.Idapbrowser.com/faq/faq.php3?slD=fe4ae66f023d86909f35e974f3a1ce>.
Internet Archive Wayback Machine, archive of LDAP Browser.com—Product Info. Archived Dec. 11, 2000. Available at <http://web.archive.org/web/200012110541/http://www.Idapbrowser.com/prodinfo/prodinfo.php3?sID=fe4ae66f2fo23d86909f35e974f3a1ce>.
Internet Archive: Audio Archive, http://www.archive.org/audio/audio-searchresults.php?search=@start=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Milic-Frayling, Natasa, et al., "SmartView: Enhanced Document Viewer for Mobile Devices," Google Nov. 15, 2002, 11 pgs.
Non-Final Office Action for U.S. Appl. No. 10/350,810, filed Jan. 24, 2003, and dated from the USPTO dated Apr. 17, 2007, 12 pgs.
Non-Final Office Action for U.S. Appl. No. 10/350,810, filed Jan. 24, 2003, and dated from the USPTO dated Dec. 9, 2005, 14 pgs.
Non-Final Office Action for U.S. Appl. No. 10/350,810, filed Jan. 24, 2003, and dated from the USPTO dated Sep. 22, 2004, 10 pgs.
Non-final Office Action for U.S. Appl. No. 10/351,606, filed Jan. 24, 2003 and dated from the USPTO dated Dec. 19, 2005, 7 pgs.
Non-final Office Action for U.S. Appl. No. 10/351,606, filed Jan. 24, 2003 and dated from the USPTO dated May 17, 2004, 5 pgs.
Non-Final Office Action for U.S. Appl. No. 10/665,899, filed Sep. 18, 2003, and dated from the USPTO dated Aug. 30, 2010, 23 pgs.
Non-Final Office Action for U.S. Appl. No. 10/665,899, filed Sep. 18, 2003, and dated from the USPTO dated Nov. 13, 2008, 11 pgs.
Non-Final Office Action for U.S. Appl. No. 10/665,899, filed Sep. 18, 2003, and dated from the USPTO dated Sep. 14, 2009, 14 pgs.
Non-Final Office Action for U.S. Appl. No. 11/149,909, filed Jun. 10, 2005, and dated from the USPTO dated May 13, 2008, 14 pgs.
Non-Final Office Action for U.S. Appl. No. 11/149,909, filed Jun. 10, 2005, and dated from the USPTO dated May 6, 2009, 6 pgs.
Non-Final Office Action for U.S. Appl. No. 11/442,821, filed May 30, 2006, and dated from the USPTO dated Jun. 1, 2011, 23 pgs.
Non-Final Office Action for U.S. Appl. No. 11/442,821, filed May 30, 2006, and dated from the USPTO dated Nov. 12, 2009, 19 pgs.
Non-Final Office Action for U.S. Appl. No. 11/442,821, filed May 30, 2006, and dated from the USPTO dated Sep. 3, 2008, 14 pgs.
Non-Final Office Action for U.S. Appl. No. 11/446,011, filed Jun. 2, 2006, and dated from the USPTO dated Mar. 1, 2011, 15 pgs.
Non-Final Office Action for U.S. Appl. No. 11/446,011, filed Jun. 2, 2006, and dated from the USPTO dated Nov. 27,2009, 14 pgs.
Non-Final Office Action for U.S. Appl. No. 11/524,602, filed Sep. 21, 2006, and dated from the USPTO dated Dec. 11, 2009, 20 pgs.
Non-Final Office Action for U.S. Appl. No. 11/525,009, filed Sep. 21, 2006, and dated from the USPTO dated Dec. 16, 2009, 20 pgs.
Non-Final Office Action for U.S. Appl. No. 12/243,852, filed Oct. 1, 2008, and dated from the USPTO dated Jan. 16, 2013, 5 pgs.
Non-Final Office Action for U.S. Appl. No. 12/243,852, filed Oct. 1, 2008, and dated from the USPTO dated Mar. 17, 2011, 8 pgs.
Non-Final Office Action for U.S. Appl. No. 12/243,855, filed Oct. 1, 2008, and dated from the USPTO dated Oct. 14, 2010, 6 pgs.
Non-Final Office Action for U.S. Appl. No. 12/243,861, filed Oct. 1, 2008, and dated from the USPTO dated Nov. 8, 2010, 8 pgs.
Non-Final Office Action for U.S. Appl. No. 13/025,019, filed Feb. 10, 2011, and dated from the USPTO dated Apr. 22, 2016, 16 pgs.
Non-Final Office Action for U.S. Appl. No. 13/025,019, filed Feb. 10, 2011, and dated from the USPTO dated Apr. 5, 2013, 15 pgs.
Non-Final Office Action for U.S. Appl. No. 13/025,019, filed Feb. 10, 2011, and dated from the USPTO dated Sep. 18, 2014, 15 pgs.
Notice of Allowance and Fee(s) Due for U.S. Appl. No. 10/350,810, filed Jan. 24, 2003, and dated from the USPTO dated Apr. 14, 2008, 6 pgs.

(56) References Cited

OTHER PUBLICATIONS

Notice of Allowance and Fee(s) Due for U.S. Appl. No. 10/351,606, filed Jan. 24, 2003 and dated from the USPTO dated Apr. 4, 2006, 8 pgs.
Notice of Allowance and Fee(s) Due for U.S. Appl. No. 11/149,909, filed Jun. 10, 2005, and dated from the USPTO dated Sep. 16, 2009, 7 pgs.
Notice of Allowance and Fee(s) Due for U.S. Appl. No. 11/442,821, filed May 30, 2006, and dated from the USPTO dated Jul. 30, 2012, 6 pgs.
Notice of Allowance and Fee(s) Due for U.S. Appl. No. 12/243,852, filed Oct. 1, 2008, and dated from the USPTO dated Feb. 27, 2013, 6 pgs.
Notice of Allowance and Fee(s) Due for U.S. Appl. No. 12/243,855, filed Oct. 1, 2008, and dated from the USPTO dated Nov. 22, 2010, 8 pgs.
Notice of Allowance and Fee(s) Due for U.S. Appl. No. 12/243,861, filed Oct. 1, 2008, and dated from the USPTO dated Sep. 6, 2011, 10 pgs.
Restriction Requirement for U.S. Appl. No. 12/243,852, filed Oct. 1, 2008, and dated from the USPTO dated Dec. 7, 2010.
Supplemental Notice of Allowability for U.S. Appl. No. 12/243,852, filed Oct. 1, 2008, and dated from the USPTO dated Mar. 19, 2013, 3 pgs.

* cited by examiner

SYSTEM AND METHOD FOR DYNAMICALLY GENERATING PERSONALIZED WEBSITES

TECHNICAL FIELD

The present disclosure relates to web page personalizing. In particular, the present disclosure relates to personalizing the content, an outline, and a theme of a web page.

BACKGROUND

A website can be comprised of a plurality of web pages. A web page can be used to convey data (e.g., content) to a user via a browser. The web page can be generated as code. The code can be provided using one or more language syntaxes. The code can be generated by an information technology specialist. Changes to the code can be time-consuming and can utilize resources that could otherwise be diverted to improve the website.

DETAILED DESCRIPTION OF PREFERRED EMBODIMENTS

Figure 1:
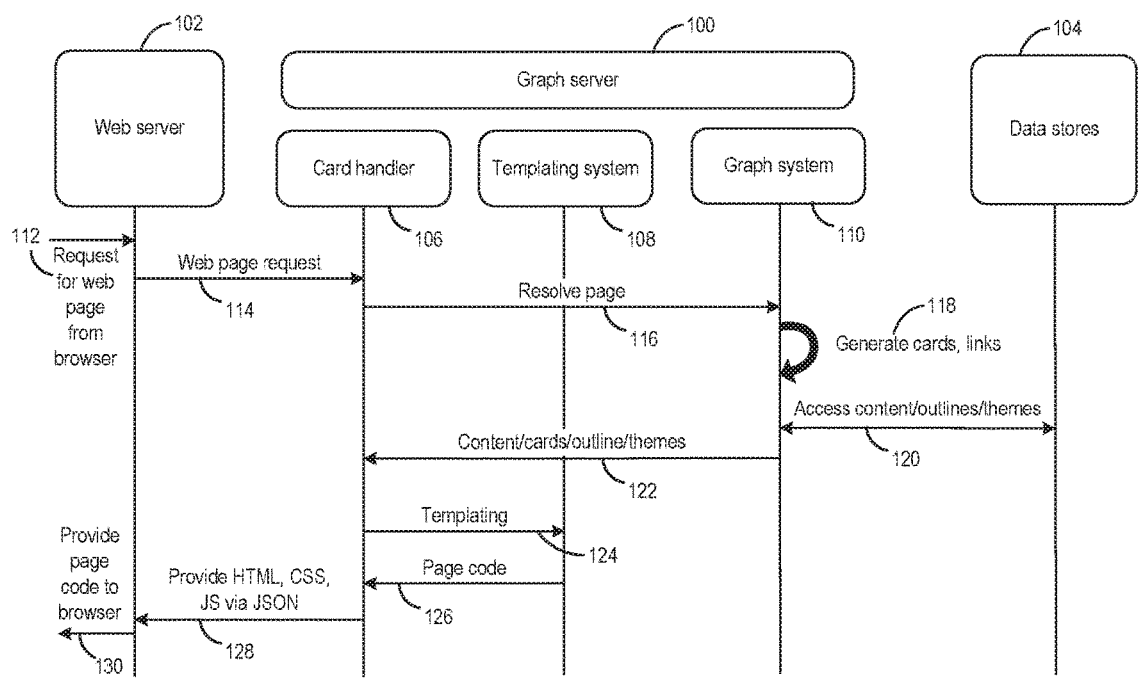
FIG. 1 is a timing diagram for personalizing a web page according to one embodiment.

Personalized web pages can be generated at run-time for consumers based on business rules and consumer intents. The run-time personalization can include personalizing an outline of a web page, personalizing the content of the web page, and/or personalizing the theme of a web page. A web page can be personalized based on configurations and/or business rules that can vary from dealer to dealer and/or original equipment manufacturer (OEM) to OEM. The configurations and/or business rules can be selected to correspond with a profile associated with the user.

As used herein, a web page can refer to a single web page or a plurality of web pages. The web page can also refer to a website comprising the web page and/or the plurality of web pages. As such, references to personalizing a web page can include personalizing a plurality of web pages and/or personalizing a website.

An outline of a web page describes a structure of a plurality of cards that comprise a web page. Personalizing the outline of the web page can include personalizing the structure of the web page. A card defines a presentational view for content of the web page. A card is a data structure comprising at least a title field, media field, copy field, link field, and card field.

A theme of a web page describes the look and feel of the web page. For example, a theme can define a collection of card styles with colors and fonts. A card style for a card can include a layout of the card (e.g., presentational components) including cascading style sheet (CSS) properties, colors, and/or fonts.

Personalizing a web page at run-time removes the need to hard-code solutions to meet specific customer needs on a specific set of devices. Personalizing a web page provides out-of-the-box multi-device support with a personalized consumer experience that can vary the content, the outline, and/or the theme of a web page.

Previous embodiments lack a clear separation between the content, the structure, and the aesthetics of a web page. A number of examples provide a separation between the content, the outline, and the theme of a web page. The content of a web page can be separated from the outline and/or the theme by utilizing a graph system. A graph system can be used to define relationships between the content (e.g., entities) of the web page.

The graph system decouples the presentation tier from having direct coupling with content sources. The graph system provides a level of abstraction that allows a set of rules that can be injected at run-time (e.g., real-time) based on the context of a consumer (e.g., profile) and/or business rules to personalize the web page. The graph system can dynamically establish the relationships (e.g., links) between the entities and/or content that are represented using nodes. The two building blocks of the graph system are nodes (e.g., entities and/or content) and links (e.g., the relationship between nodes).

The graph system provides flexibility and establishes real-time relationships between nodes. The nodes are entities. The entities can include cards, vehicles, and/or dealers and associated content, among other types of entities. The graph system allows the showing of different cards (e.g., presentational form of content) to different consumers on a same dealer website. The graph system also allows the showing of different orders of cards (e.g., changing the outline) and/or the selection of different aesthetics (e.g., themes).

A graph generated by a graph system can utilize nodes and links as described above. A graph schema associated with the graph can define core domain objects and grouping of concepts (e.g., the grouping between vehicles and vehicle specifications). A graph model of the graph is an instance of the graph that defines properties for domain objects. For example, the graph model can define what attributes a vehicle and/or vehicle specification can have. The graph schema defines existing domain objects and/or the ability to create new domain objects. The graph model provides attributes and properties for domain objects. A graph instance includes actual values for the domain objects The graph system can utilize adapters to retrieve content from various data stores (e.g., data sources). A data store can include a database, electronic memory, a storage device, cloud storage, and/or any other type of storage from which data can be retrieved. An adapter is an abstraction on top of various data sources. That is, an adapter can receive a request for data in a first syntax and can convert the request in the first syntax to a second syntax or more syntaxes to communicate with the various data sources. Each of the data sources can have a different syntax.

Reference is now made to the figures, in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a timing diagram for personalizing a web page according to one embodiment. FIG. 1 includes a graph server 100, a web server 102, and data stores 104. Each of the graph server 100, the web server 102, and/or the data stores 104 can comprise a different computing device. For example, the graph server 100 can be a first computing device, the web server 102 can be a second computing device, and/or the data stores 104 can be a third computing device, each of the computing devices comprising memory and one or more processors configured to perform one or more of the operations associated with the graph server 100, the web server 102, and/or the data stores 104.

In some examples, each of the graph server 100, the web server 102, and/or the data stores 104 can comprise two or more computing devices. For example, each of the data stores 104 can be a separate computing device.

The web server 102 can be configured to receive a request 112 for a web page. The request 112 can originate at a user browser. The user browser can be configured to render data received from the web server 102 to present a web page to the user/consumer. The web server 102 can also be configured to provide 130 page code to the user browser to provide the web page to the user browser.

The request 112 can request a specific page from a website associated with the web server 102. For example, the request 112 can request a home page, a "contact us" page, and/or an "about us" page of a website. The request 112 can also request a web page associated with a vehicle make or a vehicle model. The request 112 can be a dealer web page request and/or a dealer location page. The request 112, in some examples, can be a review web page request, among other types of web page requests.

The web server 102 can request 114 the web page from the graph server 100. The graph server 100 can comprise a card handler 106, a templating system 108, and a graph system 110. The graph server 100 can receive the request 114 at the card handler 106.

The card handler 106 and/or the web server 102 can process the request 114 and/or the request 112 to identify, create, and/or access a profile associated with the request 114 and/or the request 112. For example, the request 114 and/or the request 112 can comprise a hypertext markup language (HTML) request. The HTML request can include header information which can identify a device, a browser, and/or a user from which the HTML request originated. The HTML request can also include cookies and/or other device, browser, and/or user identifying information. The device, browser, and/or user identifying information can be used by the card handler 106 and/or the web server 102 to generate the profile. In some examples, the web server 102 can provide the request 114 and/or the profile to the card handler 106. In other examples, the card handler 106 can receive the request 114 and generate the profile.

The profile can uniquely identify the user, a browser, and/or a device associated with the user. The profile can include the purchasing state of a user/consumer. For example, the profile can define that a consumer is initiating a consumer experience and/or that the consumer has not narrowed a search for a vehicle to a specific make and/or model. The purchasing state can be determined from the quantity of times the consumer has visited the website associated with the web server 102, the quantity of times that the consumer has browsed a specific vehicle make and/or model, and/or the specific web pages that the consumer has requested in the past, among other factors that can be utilized in determining a purchasing state. The profile can also identify a gender, an age, and/or a location of the consumer. The profile can further include a propensity to buy a vehicle and/or an interest level in a vehicle which can be determined based on the browsing history of the website associated with the web server 102. The profile can include additional data that can be used to uniquely identify the consumer and/or the consumer's preferences.

The card handler 106 can resolve 116 a page, associated with the web page request 114, by requesting a plurality of cards, an outline, data, and/or themes associated with the page from the graph system 110. The graph system 110 can generate a graph.

The graph can include a plurality of nodes and links. The links can define the relationships between the nodes (e.g., between the entities represented by the nodes). A node can be a logical container that defines an entity. An entity can describe a section of a web page. For example, a search field can be an entity, a vehicle profile can be an entity, or user information can be an entity, among other types of entities. As such, a node can represent a section of the web page such as a search field, a vehicle profile, user information, dealer information, header information, and/or footer information, among other types of sections of the web page. The links can represent relationships between the nodes. For example, if a first node represents a user name and a second node represents a user address, then a link stored in the first node can point to the second node to show a relationship between the user name and the user address. If the first node is a vehicle maker and second and third nodes represent vehicle models of the vehicle maker, then the first node can store a link to each of the second node and the third node to represent a relationship between the vehicle models and the vehicle maker.

The nodes and/or the links can be created and/or selected based on a plurality of business rules and/or the profile. For example, the requested web page can include a featured vehicles section. A first node can be generated for the featured vehicles section. The business rules can identify that no more than two vehicles can be shown in the featured vehicles section based on the profile indicating that the consumer is interested in two different vehicles. As such, a second node and a third node can be generated to represent the vehicles that the consumer is interested in, and the first node can be linked to the second node and the third node.

The graph system 110 can generate 118 a plurality of cards from the nodes. For example, if the graph includes a first node and a second node, then the graph system 110 can generate a first card that corresponds to the first node and a second card that corresponds to the second node. The links between the nodes can be implemented in the cards to retain a plurality of relationships.

The graph system 110 can access 120 content associated with the cards, nodes, and/or links based on business rules and/or the profile. The graph system 110 can also access outlines and/or themes based on business rules and/or the profile. The graph system 110 can access 120 the content, the outlines, and/or the themes from the data stores 104 using one or more adapters. The adapters allow the graph system 110 to communicate with the data stores 104 by mapping a first syntax to a second syntax.

The cards, the outlines, and/or the themes, as described herein, can reference data associated with the cards, data associated with the outlines, and/or data associated with the themes. As such, for example, generating the themes can include generating CSS (e.g., theme data) and generating the outline can include generating HTML (e.g., outline data).

The graph system 110 can provide the content 122, the outlines, and/or the themes to the card handler 106. The card handler 106 can generate a templating request 124 for the templating system 108. The templating request 124 can request a page code 126 using the cards, the outlines, the content, and/or the themes. The templating system 108 can receive and/or process the templating request 12 and generate the page code 126. The page code 126 can be generated using HTML and/or a different markup language. The page code 126 can also include embedded scripting languages such as JavaScript (JS) which can affect the behavior and content of the web page. The templating system 108 can return the page code 126 to the card handler.

Generating the page code 126 can include populating an outline with the cards and/or the content associated with the cards while preserving the relationships between the cards.

In some examples, the themes can be provided in CSS or the card handler 106 can generate the CSS from the themes. The card handler 106 can also generate JS based on the themes and/or the outline to incorporate into the page code 126. The card handler 106 can provide 128 the page code 126 to the web server 102. Providing 128 the page code 126 to the web server 102 can include providing the HTML, the CSS, and/or the JS to the web server 102. In some examples, the HTML, the CSS, and/or the JS can be provided to the web server 102 as JS object notation (JSON). As previously described, the web server 102 can provide 130 the page code to the user browser.

Figure 2:
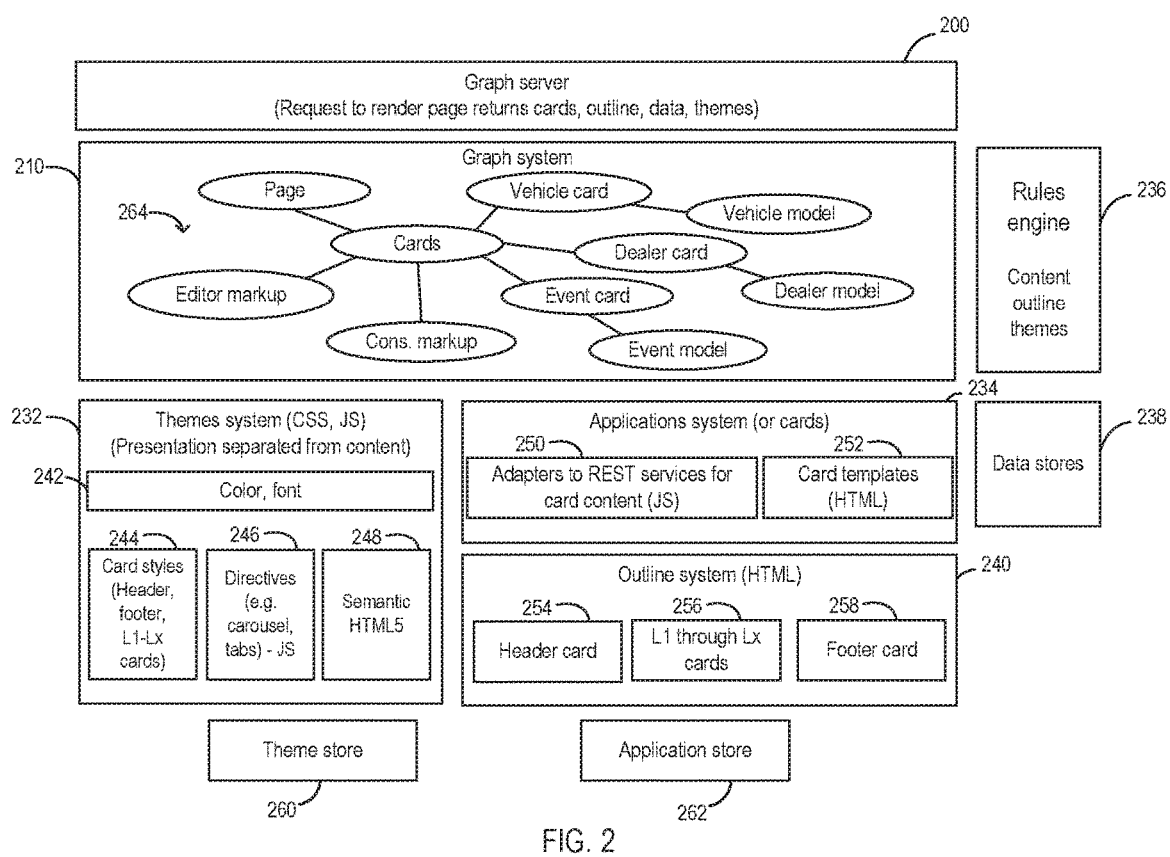
FIG. 2 is a block diagram of a graph server for personalizing a web page according to one embodiment.

FIG. 2 is a block diagram of a graph server 200 for personalizing a web page according to one embodiment. The graph server 200 can comprise a graph system 210, a themes system 232, an applications (apps) system 234, and/or an outline system 240. The graph server 200 can be analogous to the graph server 100 in FIG. 1. Each of the graph system 210, the themes system 232, the apps system 234, and/or the outline system 240 can be implemented in a separate computing device or in a single computing device. If the graph system 210, the themes system 232, the apps system 234, and/or the outline system 240 are implemented in separate computing devices, then the separate computing devices can communicate via one or more networks. The networks can include private networks and/or public networks.

The graph system 210 can generate a graph 264 comprising a plurality of nodes and links connecting the nodes. The themes system 232 can select and/or generate a theme for a web page. The theme can comprise a color and/or font 242 and card styles 244 for a header, a footer, and/or different level cards of a web page. The theme can include directives 246. The directives 246 can include a carousel and/or tabs of a web page. The directives 246 can be implemented using JS. The theme can also include semantic hypertext markup language 5 (HTML5) 248. The theme can be accessed from data stores 238 using one or more adapters. In some examples, the themes system 232 can host an adapter and/or can utilize an adapter hosted by a different system. A theme can be selected by referencing a profile and/or a themes rule from a rules engine 236. A themes rule can be a set of rules that maps a profile to a theme. The themes system 232 can provide CSS and JS to provide a theme.

The rules engine 236 can comprise software and/or hardware that can store and retrieve data. The rules engine 236 can be, for example, a database, memory, and/or a storage device. The rules engine 236 can be implemented in the graph server 200 and/or a different device. In some examples, the rules engine 236 can be hosted on a cloud system.

The outline system 240 can include, at least, a header card 254, a level 1 to level X cards 256, and/or a footer card 258. The outline can describe an organization of the header card 254, the level 1 to level X cards 256, and/or the footer card 258. The organization associated with the outline can be selected from the data stores 238 using outline rules and/or a profile. The outline rules can map a profile to a particular outline (e.g., organization). The outline rules can be accessed from the rules engine 236.

The apps system 234 can include adapters 250. The adapters 250 can be used to access content from the data stores 238. The content accessed can be selected based on the graph 264, content rules, and/or a profile. The content rules can map nodes, cards, and/or a profile to content. The apps system 234 can generate the cards and populate them with the content using card templates 252. The card templates 252 can be provided in HTML while the card content can be provided in JS.

The themes can be purchased from the theme store 260. The apps system 234 can be purchased from an application store 262.

Figure 3:
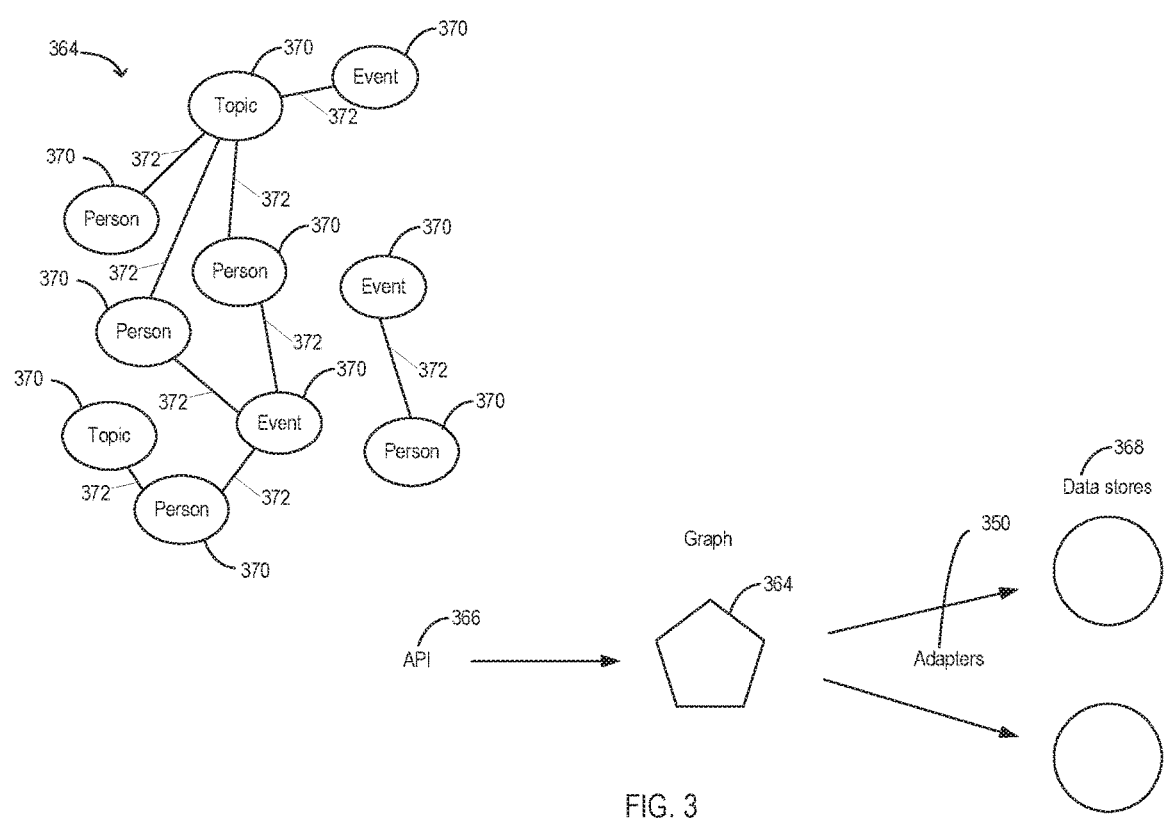
FIG. 3 is a block diagram of a graph of a web page according to one embodiment.

FIG. 3 is a block diagram of a graph 364 of a web page according to one embodiment. FIG. 3 includes a graph 364. The graph comprises nodes 370 and links 372.

Each of the nodes 370 can store one or more links 372 to the one or more nodes 370. For example, a topic node can store a first link to a first person node, a second link to a second person node, a third link to a third person node, and a fourth link to an event node. In some examples, a node may not store a link to any other node.

The graph 364 can be generated using an application programming interface (API) 366. A graph system creating the graph 364 can utilize adapters 350 to extract content from data stores 368.

Figure 4:
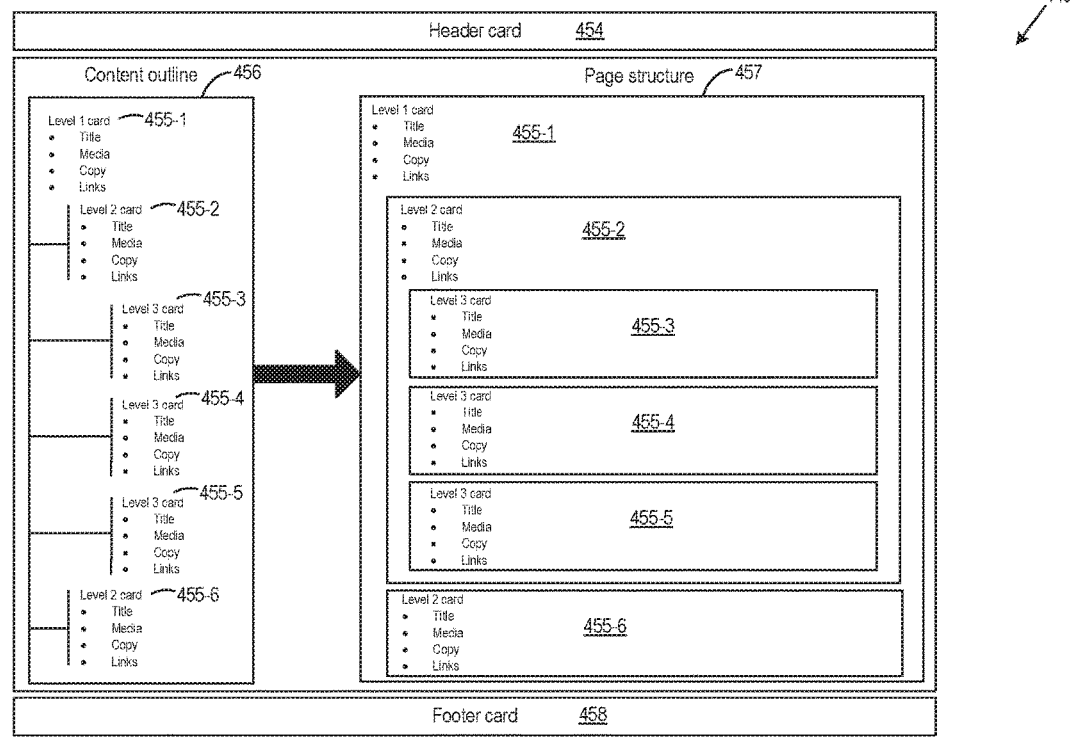
FIG. 4 is a block diagram of an outline of a web page according to one embodiment.

FIG. 4 is a block diagram of an outline 456 of a web page according to one embodiment. FIG. 4 shows an outline system 440. The outline system 440 includes the outline 456 and a page structure 457.

The outline 456 includes a plurality of cards organized in levels. For example, the outline 456 includes a level 1 card 455-1, level 2 cards 455-3 and 455-6, and level 3 cards 455-3, 455-4, and 455-5, referred to generally as cards 455. Each of the cards 455 can comprise, at least, a title field, a media field, a copy field, and/or a links field. The cards 455 can describe an outline of cards generated from nodes. The cards 455 shown in FIG. 4 describe a template of cards and not actual implemented cards.

The outline system 440 can also comprise the page structure 457. The page structure 457 can define a structure of the cards 455. In some examples, the outline 456 can be converted to the page structure 457 using HTML. The outline system 440 can also include a header card 454 and a footer card 458.

Figure 5:
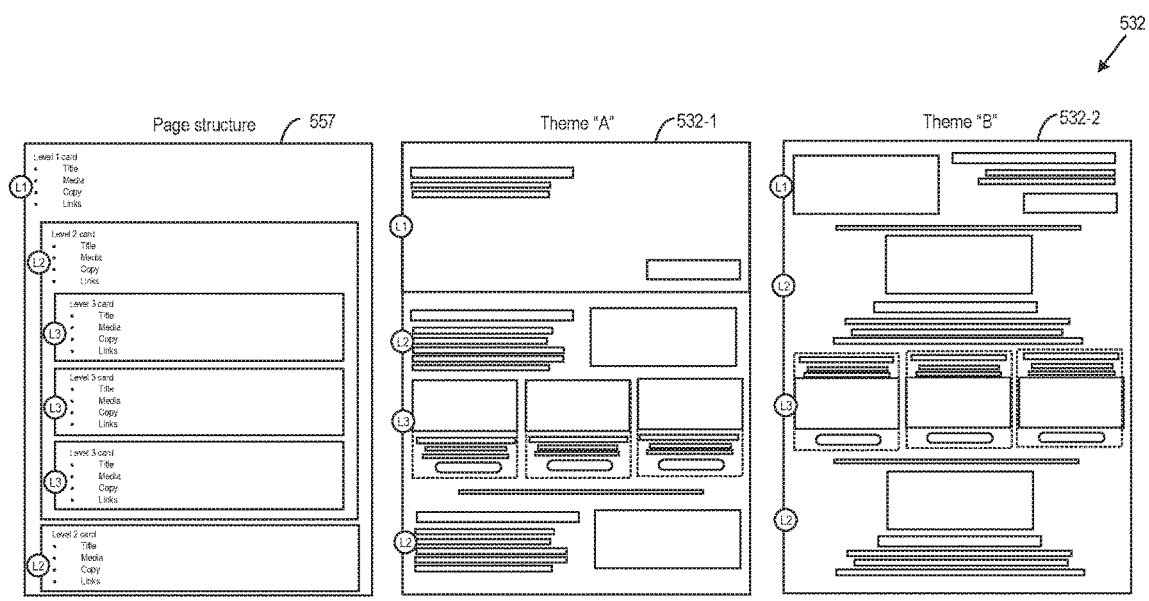
FIG. 5 is a block diagram of a theme of a web page according to one embodiment.

FIG. 5 is a block diagram of a theme of a web page according to one embodiment. FIG. 5 shows the conversion of a page structure 557 to themes 532-1 and 532-2. A themes system can receive the page structure 557 and apply a theme to the page structure 557.

For example, the themes system can apply the theme 532-1 to the page structure 557 or the theme 532-2 to the page structure 557. The themes 532-1 and 532-2 can differ in the presentation of the page structure 557 but not in the outline of the page structure 557. For example, the content associated with a level 1 card can be presented in a first manner corresponding to the theme 532-1 and a second manner corresponding to the theme 532-2. The content can be divided, rearranged, and/or formatted differently from theme to theme.

Figure 6:
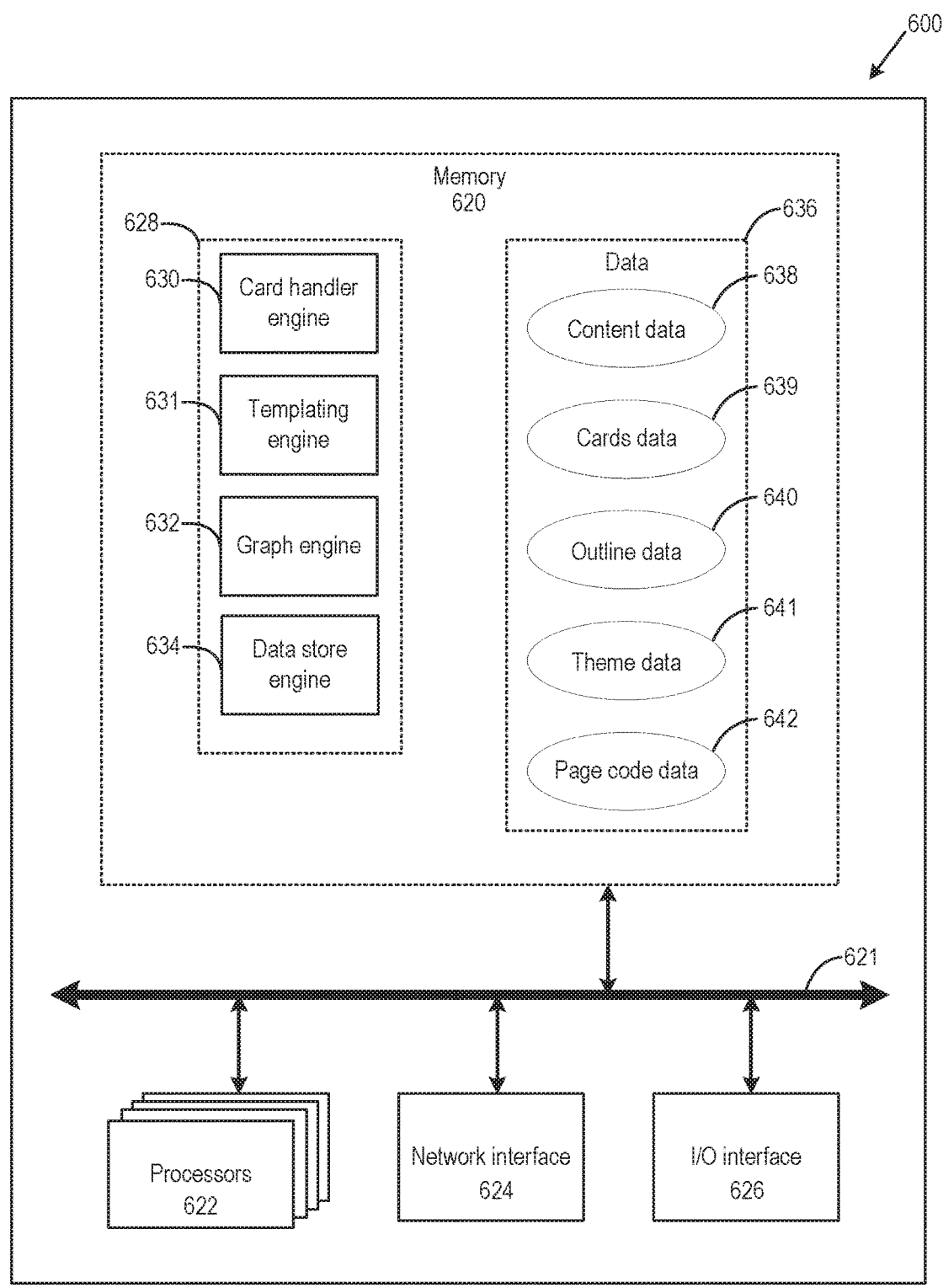
FIG. 6 is a block diagram of a device for personalizing a web page according to one embodiment.

FIG. 6 is a block diagram of a device for personalizing a web page according to one embodiment. A graph server 600 can provide page code to a web server 102 (FIG. 1) to customize a web page for a user. The graph server 600 can include a memory 620, one or more processors 622, a network interface 624, an input/output interface 626, and a system bus 621.

The one or more processors 622 may include one or more general-purpose devices, such as an Intel®, AMD®, or other standard microprocessor. The one or more processors 622 may include a special-purpose processing device, such as an ASIC, an SoC, an SiP, an FPGA, a PAL, a PLA, an FPLA, a PLD, or another customized or programmable device. The one or more processors 622 can perform distributed (e.g., parallel) processing to execute or otherwise implement functionalities of the presently disclosed embodiments. The one or more processors 622 may run a standard operating system and perform standard operating system functions. It is recognized that any standard operating system may be used, such as, for example, Microsoft® Windows®, Apple® MacOS®, Disk Operating System (DOS), UNIX, IRJX, Solaris, SunOS, FreeBSD, Linux®, ffiM® OS/2®, and so forth.

The memory 620 may include static RAM, dynamic RAM, flash memory, one or more flip-flops, ROM, CD-ROM, DVD, disk, tape, or magnetic, optical, or other computer storage medium. The memory 620 may include a plurality of program engines 628 and program data 636. The memory 620 may be local to the graph server 600, as shown, or may be distributed and/or remote relative to the graph server 600.

The program engines 628 may include all or portions of other elements of the graph server 100. The program engines 628 may run multiple operations concurrently or in parallel by or on the one or more processors 622. In some embodiments, portions of the disclosed engines, components, and/or facilities are embodied as executable instructions embodied in hardware or in firmware, or stored on a non-transitory, machine-readable storage medium, such as the memory 620. The instructions may comprise computer program code that, when executed by a processor and/or computing device, causes a computing system (such as the processors 622 and/or the graph server 600) to implement certain processing steps, procedures, and/or operations, as disclosed herein. The engines, modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the engines disclosed herein may be referred to as controllers, layers, services, modules, facilities, drivers, circuits, and/or the like.

The memory 620 may also include the program data 636. Data generated by the graph server 100, such as by the program engines 628 or other engines, may be stored on the memory 620, for example, as the stored program data 636. The stored program data 636 may be organized as one or more databases. In certain embodiments, the program data 636 may be stored in a database system. The database system may reside within the memory 620. In other embodiments, the program data 636 may be remote, such as in a distributed computing and/or storage environment. For example, the program data 636 may be stored in a database system on a remote computing device.

The input/output interface 626 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 624 may facilitate communication with other computing devices and/or networks and/or other computing and/or communications networks. The network interface 624 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 624 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 621 may facilitate communication and/or interaction between the other components of the graph server 600, including the one or more processors 622, the memory 620, the input/output interface 626, and the network interface 624.

As noted, the graph server 600 also includes the various program engines 628 (or modules, elements, or components) to implement functionalities of the graph server 600, including a card handler engine 630, a templating engine 631, a graph engine 632, and/or a data store engine 634. These elements may be embodied, for example, at least partially in the program engines 628. In other embodiments, these elements may be embodied or otherwise implemented in hardware of the graph server 600. The graph server 600 also includes content data 638, cards data 639, outline data 640, theme data 641, and page code data 642 that may be stored in the program data 636 which may be generated, accessed, and/or manipulated by the program engines 628.

The card handler engine 630 is configured to resolve a web page request by accessing the content data 638, the cards data 639, and the outline data 640. The graph engine 632 is configured to provide the content data 638, the cards data 639, and/or the outline data 640 to the card handler engine 630. The graph engine 632 can retrieve the content data 638, the cards data 639, and/or the outline data 640 from the data store engine 634. The card handler engine 630 is also configured to request a template from the templating engine 631. The templating engine 631 is configured to generate the page code data 642 from the content data 638, the cards data 639, and the outline data 640. The templating engine 631 can provide the page code data 642 to the card handler engine 630.

Figure 7:
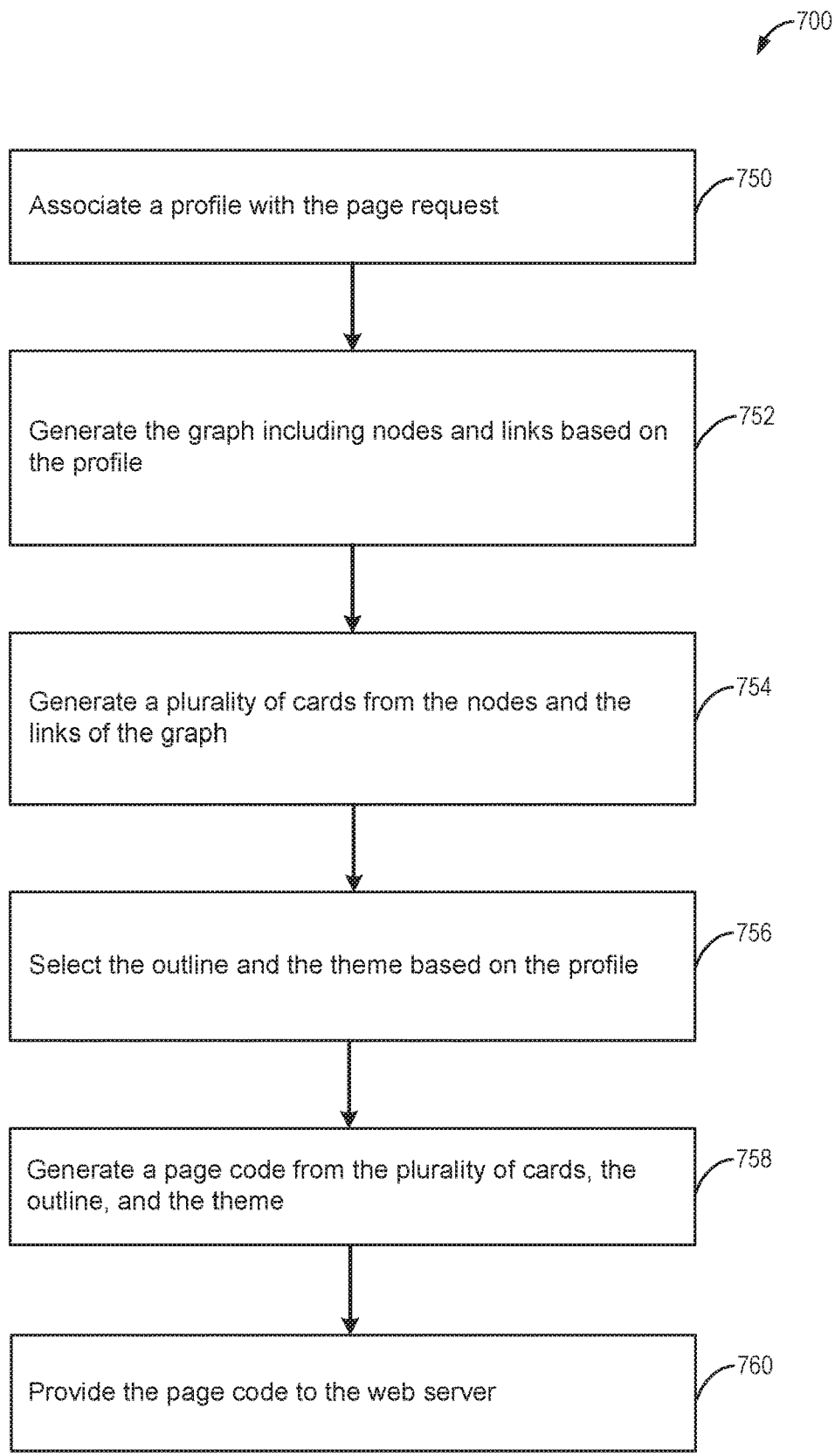
FIG. 7 is a flowchart of a method for web page personalizing according to one embodiment.

FIG. 7 is a flowchart of a method 700 for web page personalizing according to one embodiment. The method 700 includes associating 750 a profile with a page request; generating 752 a graph including nodes and links based on the profile; generating 754 a plurality of cards from the nodes and the links of the graph; selecting 756 an outline and a theme based on the profile; generating 758 a page code from the plurality of cards, the outline, and the theme; and providing 760 the page code to a web server.

Generating 754 the plurality of cards further comprises generating the plurality of cards to provide a presentational view of the nodes and associated content. Each of the plurality of cards can include a title field, a media field, a copy field, and a links field. The links field can correspond to the links.

Generating 752 the graph based on the profile further comprises accessing a plurality of rules, stored in the electronic memory, to generate the graph, wherein the plurality of rules to generate the graph are selected based on the profile. Selecting 756 the outline and the theme further comprises selecting the outline based on a plurality of rules, stored in the electronic memory, that correlate profiles to outlines and selecting the theme based on a plurality of rules, stored in the electronic memory, that correlate profiles to themes.

Generating 758 the page code further comprises generating data that is processed by a browser to generate a web page. The web server can receive the web page request for a web page. The web page request can comprise data that is used to generate the profile.

Figure 8:
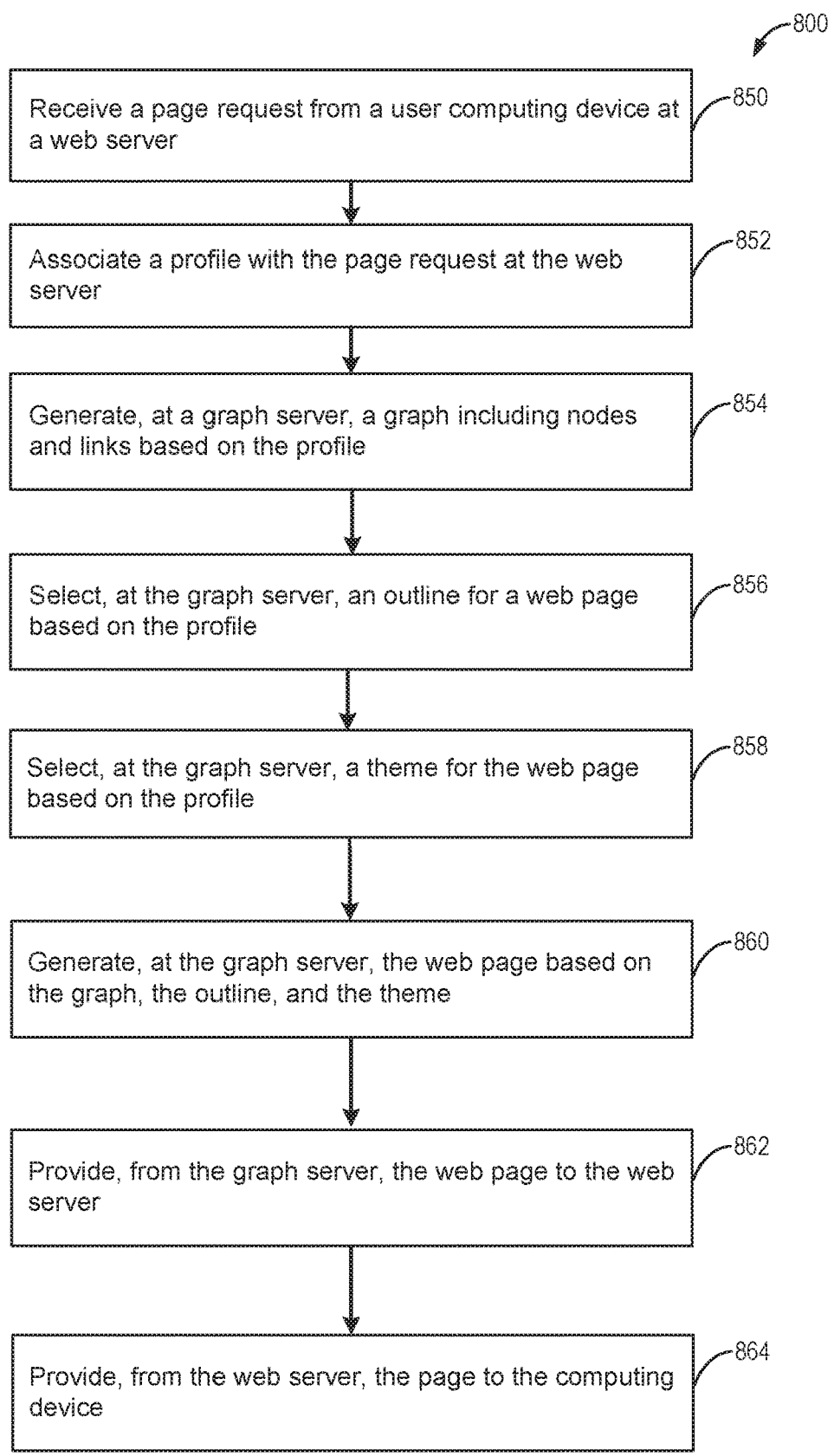
FIG. 8 is a flowchart of a method for web page personalizing according to one embodiment.

FIG. 8 is a flowchart of a method 800 for web page personalizing according to one embodiment. The method 800 can include receiving 850 a web page request from a user computing device at a web server; associating 852 a profile with the web page request at the web server; generating 854, at a graph server, a graph including nodes and links based on the profile; selecting 856, at the graph server, an outline for a web page based on the profile; selecting 858, at the graph server, a theme for the web page based on the profile; generating 860, at the graph server, the web page based on the graph, the outline, and the theme; providing 862, from the graph server, the web page to the web server; and providing 864, from the web server, the web page to the computing device.

Associating 852 the profile can further comprise associating a user profile with the web page request. Associating 852 the profile can further comprise associating a device profile with the web page request. Generating 854 the graph can comprise generating a plurality of nodes that are connected by the links, wherein the plurality of nodes represent a plurality of entities and associated content of the web page generated based on the web page request. Generating 860 the web page can comprise organizing the plurality of entities and the associated content in the outline. Organizing the plurality of entities and the associated content in the outline can further comprise organizing the plurality of entities and the associated content in the outline while maintaining relationships between the plurality of entities as prescribed by the links. Generating 860 the web page can further comprise combining the outline and the theme in the web page.

Figure 9:
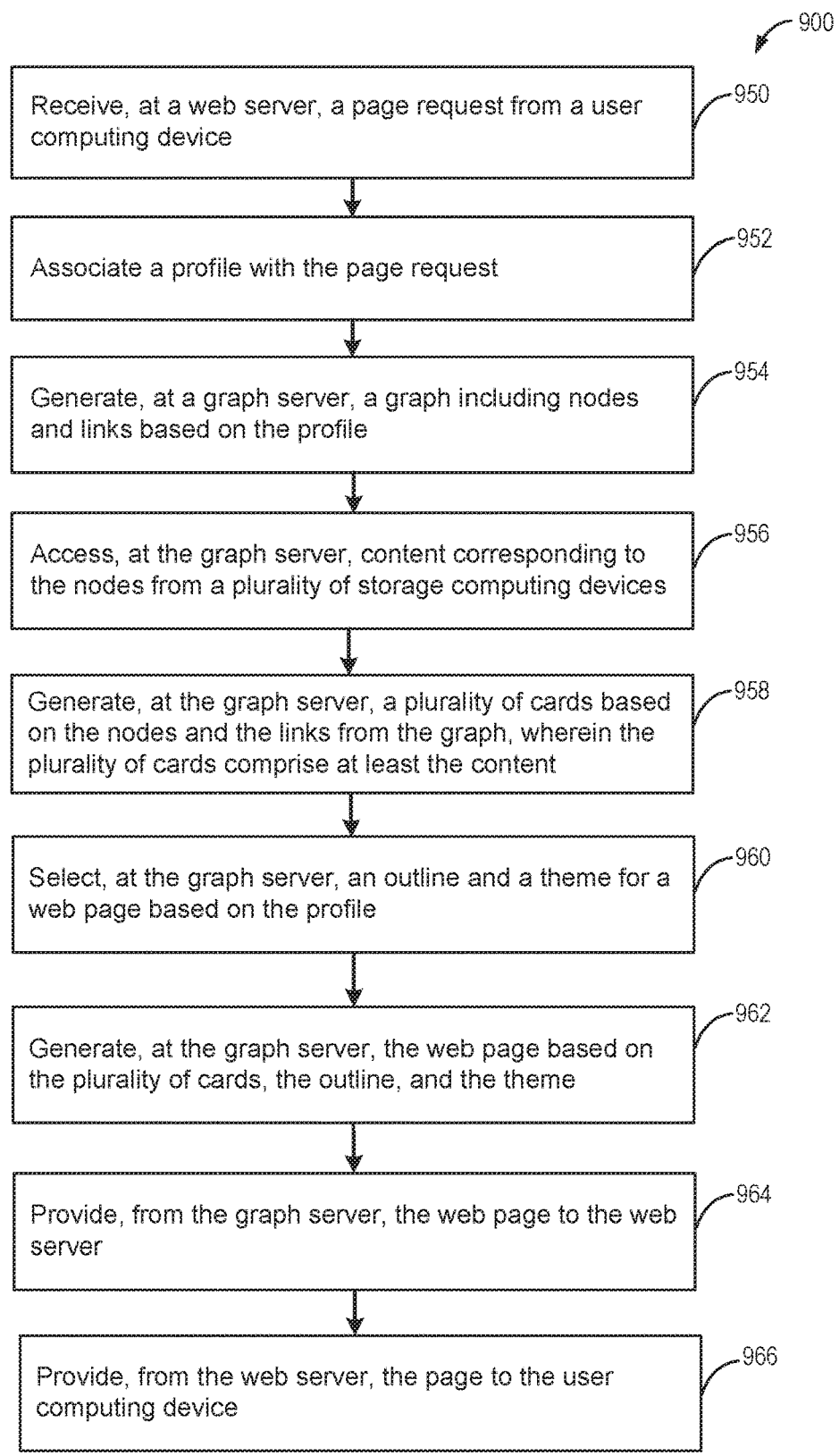
FIG. 9 is a flowchart of a method for web page personalizing according to one embodiment.

FIG. 9 is a flowchart of a method 900 for web page personalizing according to one embodiment. The method 900 can include receiving 950, at a web server, a web page request from a user computing device; associating 952 a profile with the web page request; generating 954, at a graph server, a graph including nodes and links based on the profile; accessing 956, at the graph server, content corresponding to the nodes from a plurality of storage computing devices; generating 958, at the graph server, a plurality of cards based on the nodes and the links from the graph, wherein the plurality of cards comprise at least the content; selecting 960, at the graph server, an outline and a theme for a web page based on the profile; generating 962, at the graph server, the web page based on the plurality of cards, the outline, and the theme; providing 964, from the graph server, the web page to the web server; and providing 966, from the web server, the web page to the user computing device.

The plurality of storage computing devices can comprise a plurality of different data stores with different syntaxes. Accessing 956 the content can further comprise providing a request, using a single syntax, for the content to an adapter system that communicates with the plurality of different data stores using a plurality of different syntaxes.

The above described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions.

As used herein, a software module or component may include any type of computer instruction or computer-executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

What is claimed is:

1. A server to generate a web page, the server comprising:
   an electronic memory to store a web page request received from a web server responsive to a request for a web page originating from a user operating a web browser; and
   one or more processing units configured to:
      associate a profile with the web page request, the profile corresponding to the user operating the web browser;
      generate a graph including nodes and links based on the profile, each one of the nodes including content to be displayed by the web page, the links defining relationships between nodes;
      generate a plurality of cards from the nodes and the links of the graph, each card of the plurality of cards corresponding to one of the nodes, each card of the plurality of cards comprising a presentational form of the content of the corresponding one of the nodes to be displayed in a specific section within a displayed layout of the web page;
      select an outline and a theme based on the profile, the outline comprising a specific structural organization of the plurality of cards within the displayed layout of the web page, the theme comprising a defined collection of layouts for the plurality of cards, each layout of the defined collection of layouts defining positions of content elements within a corresponding card of the plurality of cards;
      generate a page code from the plurality of cards, the outline, and the theme; and
      provide the page code to the web server for distribution to the web browser.

2. The server of claim 1, wherein the web page comprises a vehicle dealer web page and at least one of the nodes corresponds to a vehicle.

3. The server of claim 1, wherein each of the plurality of cards includes a title field, a media field, a copy field, and a links field.

4. The server of claim 3, wherein the links field corresponds to the links.

5. The server of claim 1, wherein the one or more processing units configured to generate the graph based on the profile are further configured to access a plurality of rules, stored in the electronic memory, to generate the graph, wherein the plurality of rules to generate the graph are selected based on the profile.

6. The server of claim 1, wherein the one or more processing units configured to select the outline and the theme are further configured to:
   select the outline based on a plurality of rules, stored in the electronic memory, that correlate profiles to outlines; and
   select the theme based on a plurality of rules, stored in the electronic memory, that correlate the profiles to the themes.

7. The server of claim 1, wherein the one or more processing units configured to generate the page code are further configured to generate data that is processed by the web browser to generate the web page.

8. The server of claim 1, wherein the plurality of cards includes a card including at least one other card of the plurality of cards within the card.

9. The server of claim 1, wherein the web page request comprises data that is used to generate the profile.

10. A computer-readable storage medium having stored thereon instructions that, when implemented by a computing device, cause the computing device to:
   receive a web page request from a user computing device at a web server;
   associate a profile with the web page request at the web server;
   generate, at a graph server, a graph including nodes and links based on the profile, each one of the nodes including content to be displayed by the web page, the links defining relationships between the nodes;
   select, at the graph server, an outline for the web page based on the profile, the outline comprising a specific structural organization of a plurality of cards, each card of the plurality of cards corresponding to one of the nodes, each card of the plurality of cards comprising a presentation form of the content of the corresponding one of the nodes to be displayed in a specific section within a displayed layout of the web page;
   select, at the graph server, a theme for the web page based on the profile, the theme comprising a defined collection of layouts for the plurality of cards, each layout of the defined collection of styles defining positions of content elements within a corresponding card of the plurality of cards;
   generate, at the graph server, the web page based on the graph, the outline, and the theme;
   provide, from the graph server, the web page to the web server; and
   provide, from the web server, the web page to the computing device.

11. The computer-readable storage medium of claim 10, wherein the instructions to associate the profile further comprise instructions to associate a user profile with the web page request.

12. The computer-readable storage medium of claim 10, wherein the instructions to associate the profile further comprise instructions to associate a device profile with the web page request.

13. The computer-readable storage medium of claim 10, wherein the theme further comprises a defined collection of styles for the plurality of cards, each style of the defined collection of styles including cascading style sheet (CSS) properties, colors, fonts, or combinations thereof.

14. The computer-readable storage medium of claim 10, wherein the instructions to generate the web page include instructions to organize the plurality of cards and the associated content in the outline.

15. The computer-readable storage medium of claim 14, wherein the instructions to organize the plurality of cards and the associated content in the outline further comprise instructions to organize the plurality of cards and the associated content in the outline while maintaining relationships between the plurality of entities as prescribed by the links.

16. The computer-readable storage medium of claim 14, wherein the instructions to generate the web page further include instructions to combine the outline and the theme in the web page.

17. A method comprising:
receiving, at a web server, a web page request from a user computing device;
associating a profile with the web page request;
generating, at a graph server, a graph including nodes and links based on the profile, each one of the nodes including content to be displayed by the web page, the links defining relationships between the nodes;
accessing, at the graph server, content corresponding to the nodes from a plurality of storage computing devices;
generating, at the graph server, a plurality of cards based on the nodes and the links from the graph, wherein the plurality of cards comprise at least the content, each card of the plurality of cards corresponding to one of the nodes, each card of the plurality of cards comprising a presentational form of the content of the corresponding one of the nodes to be displayed in a specific section within a displayed layout of the web page;
selecting, at the graph server, an outline and a theme for a web page based on the profile, the outline comprising a specific structural organization of the plurality of cards within the displayed layout of the web page, the theme comprising a defined collection of layouts for the plurality of cards, each layout of the defined collection of layouts defining positions of content elements within a corresponding card of the plurality of cards;
generating, at the graph server, the web page based on the plurality of cards, the outline, and the theme;
providing, from the graph server, the web page to the web server; and
providing, from the web server, the web page to the user computing device.

18. The method of claim 17, wherein the plurality of storage computing devices comprise a plurality of different data stores with different syntaxes.

19. The method of claim 18, wherein accessing the content further comprises providing a request, using a single syntax, for the content to an adapter system that communicates with the plurality of different data stores using the different syntaxes.

* * * * *